US010193674B2

(12) United States Patent
Wu et al.

(10) Patent No.: US 10,193,674 B2
(45) Date of Patent: Jan. 29, 2019

(54) METHODS AND SYSTEMS FOR PROCESSING A GLOBAL NAVIGATION SATELLITE SYSTEM SIGNAL

(71) Applicant: QUALCOMM Incorporated, San Diego, CA (US)

(72) Inventors: Jie Wu, San Diego, CA (US); Duong Hoang, San Diego, CA (US); Mariam Motamed, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 15/371,602

(22) Filed: Dec. 7, 2016

(65) Prior Publication Data

US 2017/0180094 A1  Jun. 22, 2017

Related U.S. Application Data

(60) Provisional application No. 62/269,753, filed on Dec. 18, 2015.

(51) Int. Cl.
| | |
|---|---|
| *H04L 5/00* | (2006.01) |
| *H04L 5/14* | (2006.01) |
| *H04W 4/06* | (2009.01) |
| *G01S 19/14* | (2010.01) |
| *G01S 19/21* | (2010.01) |
| *H04W 72/04* | (2009.01) |

(52) U.S. Cl.
CPC ............ *H04L 5/0048* (2013.01); *G01S 19/14* (2013.01); *G01S 19/21* (2013.01); *H04L 5/14* (2013.01); *H04W 4/06* (2013.01); *H04W 72/0453* (2013.01)

(58) Field of Classification Search
CPC ......... H04L 5/0048; H04L 5/14; G01S 19/21; G01S 19/14; H04W 4/06; H04W 72/0453
See application file for complete search history.

(56) References Cited

U.S. PATENT DOCUMENTS

| | | | |
|---|---|---|---|
| 6,286,104 B1 * | 9/2001 | Buhle | H04L 63/105 |
| | | | 707/999.009 |
| 6,799,050 B1 | 9/2004 | Krasner | |
| 9,037,089 B2 * | 5/2015 | Sang | H04W 72/1215 |
| | | | 455/114.2 |
| 9,681,487 B2 * | 6/2017 | Chatterjee | H04W 76/048 |
| 2008/0130483 A1 | 6/2008 | Khandekar et al. | |

(Continued)

FOREIGN PATENT DOCUMENTS

WO  WO-2015094914 A1  6/2015

OTHER PUBLICATIONS

International Search Report and Written Opinion—PCT/US2016/067061—ISA/EPO—Mar. 31, 2017.

*Primary Examiner* — Brian T O Connor
(74) *Attorney, Agent, or Firm* — Bala Ramasamy; Berkeley Law & Technology Grp

(57) ABSTRACT

Disclosed are methods, systems and devices for addressing a jammer signal transmitted by a device that effects a signal received at a receiver. In a particular embodiment, an application content signal is encoded for transmission in a wireless transmission medium to provide symbol content where the symbol content comprises at least some symbols representing the application content signal. A receiver may be selectively blanked synchronized with at least a portion of the symbol content.

25 Claims, 8 Drawing Sheets

(56) References Cited

U.S. PATENT DOCUMENTS

| | | |
|---|---|---|
| 2008/0231512 A1 | 9/2008 | Yeshayahu |
| 2011/0255431 A1 | 10/2011 | Wang et al. |
| 2011/0319025 A1* | 12/2011 | Siomina .............. H04B 7/024 |
| | | 455/63.1 |
| 2012/0140690 A1* | 6/2012 | Choi .................. G01S 19/03 |
| | | 370/311 |
| 2012/0207040 A1 | 8/2012 | Comsa et al. |
| 2013/0107870 A1 | 5/2013 | Neumann |
| 2013/0210364 A1 | 8/2013 | Mayor et al. |
| 2013/0286907 A1 | 10/2013 | Wei et al. |
| 2014/0369389 A1* | 12/2014 | Sang .................. H04W 4/02 |
| | | 375/144 |
| 2014/0376398 A1 | 12/2014 | Li et al. |
| 2015/0109932 A1* | 4/2015 | Goldhamer ....... H04W 72/0453 |
| | | 370/236 |
| 2015/0341940 A1* | 11/2015 | Sang ............... H04W 72/1215 |
| | | 370/252 |
| 2017/0230914 A1* | 8/2017 | Papasakellariou .... H04W 52/34 |
| 2017/0261615 A1* | 9/2017 | Ying .................. G01S 19/21 |

* cited by examiner

METHODS AND SYSTEMS FOR PROCESSING A GLOBAL NAVIGATION SATELLITE SYSTEM SIGNAL

CROSS-REFERENCE TO RELATED APPLICATIONS

This application claims the benefit of U.S. Provisional Application Nos. 62/269,753, entitled "Methods and Systems for Processing a Global Navigation Satellite System Signal," filed Dec. 18, 2015, which is assigned to the assignee hereof and which is expressly incorporated herein by reference.

BACKGROUND

Field

Embodiments described herein are directed to obtaining measurements of signals acquired from a mobile transmitter.

Information

Satellite positioning systems (SPSs), such as the global positioning system (GPS), have enabled navigation services for mobile handsets in outdoor environments. A mobile handset may have a navigation receiver capable of acquiring signals transmitted by an SPS to obtain a position fix. Unfortunately, in certain scenarios noise and interference (e.g., from a local jamming signal) at navigation receiver may introduce false detections leading to erroneous position estimates.

SUMMARY

Briefly, one particular implementation is directed to a method, at a mobile device, comprising: transmitting an uplink signal in a wireless communication link; and selectively blanking a satellite positioning system (SPS) receiver synchronized with a portion of content in the transmitted uplink signal.

Another particular implementation is directed to a mobile device comprising: a satellite positioning system (SPS) receiver to acquire SPS signals; and a modem device to: encode content for transmission in an uplink signal in a wireless communication link; and generate a signal to blank the SPS receiver synchronized with a portion of the content.

Another particular implementation is directed to a mobile device, comprising: means for transmitting an uplink signal in a wireless communication link; and means for selectively blanking a satellite positioning system (SPS) receiver synchronized with a portion of content in the transmitted uplink signal.

Another particular implementation is directed to a storage medium comprising computer-readable instructions stored thereon which are executable by one or more processors of a mobile device to: encode content for transmission in an uplink signal in a frequency division duplexing (FDD) wireless communication link; and generate a signal to blank an SPS receiver synchronized with a portion of the content.

In another particular implementation, a method, at a communication device, comprises: encoding an application content signal for transmission in a wireless transmission medium to provide symbol content, the symbol content comprising first symbols to represent portions of the application content signal; upconverting the symbol content to a radio frequency signal for transmission in the wireless transmission medium; and selectively blanking a receiver synchronized with at least a portion of the symbol content. In a particular implementation, the symbol content further comprises second symbols interleaved with the first symbols to control a communication channel in the wireless transmission medium. In another particular implementation, selectively blanking the receiver further comprises generating a blanking signal synchronized with at least a portion of the second symbols. In another particular implementation, the second symbols comprise DMRS or SRS symbols. In another particular implementation, the symbol content is upconverted for transmission in an FDD wireless communication link. In another particular implementation, the symbol content is upconverted for transmission in a WLAN communication link or a WPAN communication link, or a combination thereof.

In another particular implementation, a communication device comprises: a receiver to receive radio frequency signals; a modem device to: encode an application content signal for transmission in a wireless transmission medium to provide symbol content, the symbol content comprising first symbols to represent portions of the application content signal; and generate a signal to selectively blank the receiver synchronized with at least a portion of the symbol content.

In another particular implementation, a storage medium comprises computer-readable instructions stored thereon which are executable by a processor of a communication device to: encode an application content signal for transmission in a wireless transmission medium to provide symbol content, the symbol content comprising first symbols to represent portions of the application content signal; and generate a signal to selectively blank the receiver synchronized with at least a portion of the symbol content.

In another embodiment, as described above a communication device comprises: means for encoding an application content signal for transmission in a wireless transmission medium to provide symbol content, the symbol content comprising first symbols to represent portions of the application content signal; means for upconverting the symbol content to a radio frequency signal for transmission in the wireless transmission medium; and means for selectively blanking a receiver synchronized with at least a portion of the symbol content.

It should be understood that the aforementioned implementations are merely example implementations, and that claimed subject matter is not necessarily limited to any particular aspect of these example implementations.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
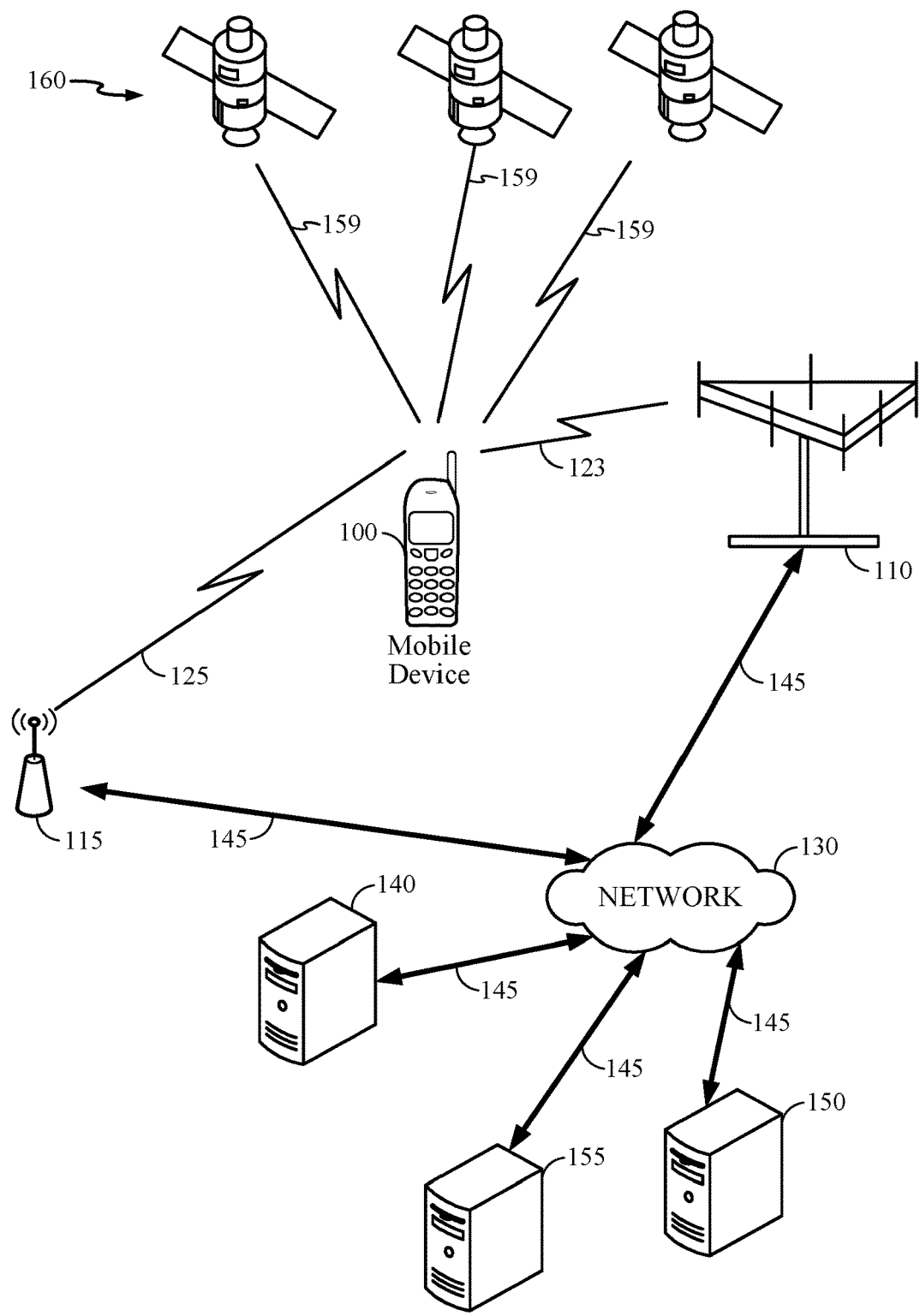
FIG. 1 is a system diagram illustrating certain features of a system containing a mobile device, in accordance with an implementation.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

Wireless communication systems have developed through various generations, including a first-generation analog wireless phone service (1G), a second-generation (2G) digital wireless phone service (including interim 2.5G networks) and third-generation (3G) and fourth-generation (4G) high speed data/Internet-capable wireless services.

More recently, Long Term Evolution (LTE) has been developed by the 3$^{rd}$ Generation Partnership Project (3GPP) as a radio access network technology for wireless communication of high-speed data and packetized voice for mobile phones and other mobile terminals. LTE has evolved from the Global System for Mobile Communications (GSM) system and from derivatives of GSM, such as Enhanced Data rates for GSM Evolution (EDGE), Universal Mobile Telecommunications System (UMTS), and High-Speed Packet Access (HSPA).

Uplink carrier aggregation (ULCA) is one particular technique for improving upload speeds for an LTE enabled mobile device, which may include increasing modulation complexity and throughput from 16-QAM to 64-QAM. However, these improved uplink bandwidth figures may not be reliably achieved in poor coverage areas. In a particular implementation of an LTE enabled mobile device, use of frequency division duplexing (FDD) for communicating with a base station in a wireless communication link may allow for greater coverage.

An LTE enabled mobile device may include a navigation receiver such as a receiver capable of acquiring signals transmitted by space vehicles (SVs) in a global navigation satellite system (GNSS). Unfortunately, transmission of an uplink signal by an LTE enabled mobile device in an FDD link may bring about a multi-tone jammer effect on a GNSS receiver of the mobile device. In particular, transmission of certain particular content in an uplink portion of an FDD wireless communication link may bring about spectral components that interfere with a receiving band of a GNSS receiver, giving rise to false detections at the GNSS receiver. For example, transmission of certain content such as a demodulation reference signal (DMRS) symbol or a sounding reference signal (SRS) symbol in an uplink may impart a multi-tone jammer effect to the GNSS receiver. As illustrated below such a multi-tone jammer effect may impart tones that are uniformly spaced in frequency.

According to an embodiment, a GNSS receiver on a mobile device may be selectively blanked in synchronization with a portion of content in an uplink signal being transmitted by the mobile device. Selectively blanking the GNSS receiver during transmission of particular content in the uplink signal may enable use of the GNSS receiver simultaneously with transmission of the uplink signal while reducing or eliminating the jamming effects from transmission of certain content in the uplink signal (e.g., SRS symbol or DMRS symbol).

FIG. 1 is a system diagram illustrating certain features of a system containing a mobile device (MD) 100, in accordance with an implementation. An MD 100 may receive or acquire satellite positioning system (SPS) signals 159 from SPS satellites 160. In some implementations, SPS satellites 160 comprising transmitters may be from one global navigation satellite system (GNSS), such as the GPS or Galileo satellite systems. In other implementations, the SPS Satellites may be from multiple GNSS such as, but not limited to, GPS, Galileo, Glonass, or Beidou (Compass) satellite systems. In other implementations, SPS satellites may be from any one several regional navigation satellite systems (RNSS') such as, for example, WAAS, EGNOS, QZSS, just to name a few examples.

In addition, the MD 100 may transmit radio signals to, and/or receive radio signals from, a wireless communication network. In one example, MD 100 may communicate with a cellular communication network by transmitting wireless signals to, or receiving wireless signals from, a base station transceiver 110 over a wireless communication link 123. Similarly, MD 100 may transmit wireless signals to, or receiving wireless signals from a local transceiver 115 over a wireless communication link 125.

In a particular implementation, local transceiver 115 may be configured to communicate with MD 100 at a shorter range over wireless communication link 123 than at a range enabled by base station transceiver 110 over wireless communication link 123. For example, local transceiver 115 may be positioned in an indoor environment. Local transceiver 115 may provide access to a wireless local area network (WLAN, e.g., IEEE Std. 802.11 network) or wireless personal area network (WPAN, e.g., Bluetooth network). In another example implementation, local transceiver 115 may comprise a femtocell transceiver capable of facilitating communication on link 125 according to a cellular communication protocol. Of course, it should be understood that these are merely examples of networks that may communicate with an MD over a wireless link, and/or claimed subject matter is not limited in this respect.

In a particular implementation, base station transceiver 110 and/or local transceiver 115 may communicate with servers 140, 150 and/or 155 over a network 130 through links 145. Here, network 130 may comprise any combination of wired or wireless links. In a particular implementation, network 130 may comprise Internet Protocol (IP) infrastructure capable of facilitating communication between MD 100 and servers 140, 150 or 155 through local transceiver 115 or base station transceiver 110. In another implementation, network 130 may comprising cellular communication network infrastructure such as, for example, a base station controller or master switching center to facilitate mobile cellular communication with MD 100.

In particular implementations, and/or as discussed below, MD 100 may have circuitry and/or processing resources capable of computing a position fix or estimated location of MD 100. For example, MD 100 may compute a position fix based, at least in part, on pseudorange measurements to four or more SPS satellites 160. Here, MD 100 may compute such pseudorange measurements based, at least in part, on pseudonoise code phase detections in signals 159 acquired from four or more SPS satellites 160. In particular implementations, MD 100 may receive from server 140, 150 or 155 positioning assistance data to aid in the acquisition of signals 159 transmitted by SPS satellites 160 including, for example, almanac, ephemeris data, Doppler search windows, just to name a few examples.

As discussed above, in a particular embodiment, MD 100 may communicate with base station transceiver 110 over an LTE enabled FDD wireless communication link. As such, an uplink portion of the wireless communication link 123 may impart a multi-tone jammer signal to an SPS receiver at MD 100 while attempting to acquire SPS signals 159 for performing positioning operations. In a particular implementation, MD 100 may blank the SPS receiver synchronously with content being transmitted on the uplink portion of the wireless communication link 123 to avoid or ameliorate the effects of a multi-tone jammer.

Figure 2:
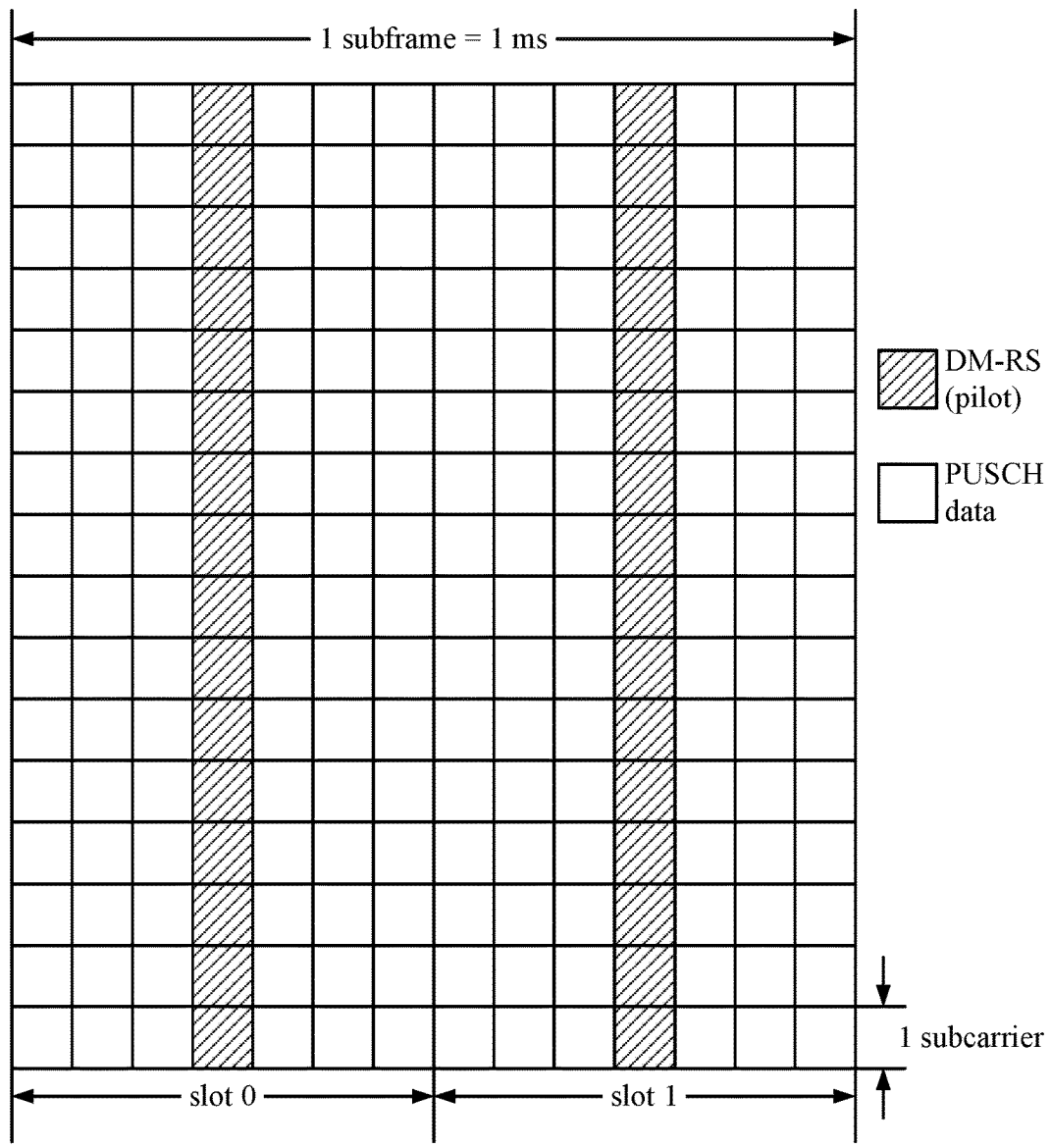
FIGS. 2 and 3 illustrate features of a portion of an uplink signal according to particular embodiments.
Figure 3:
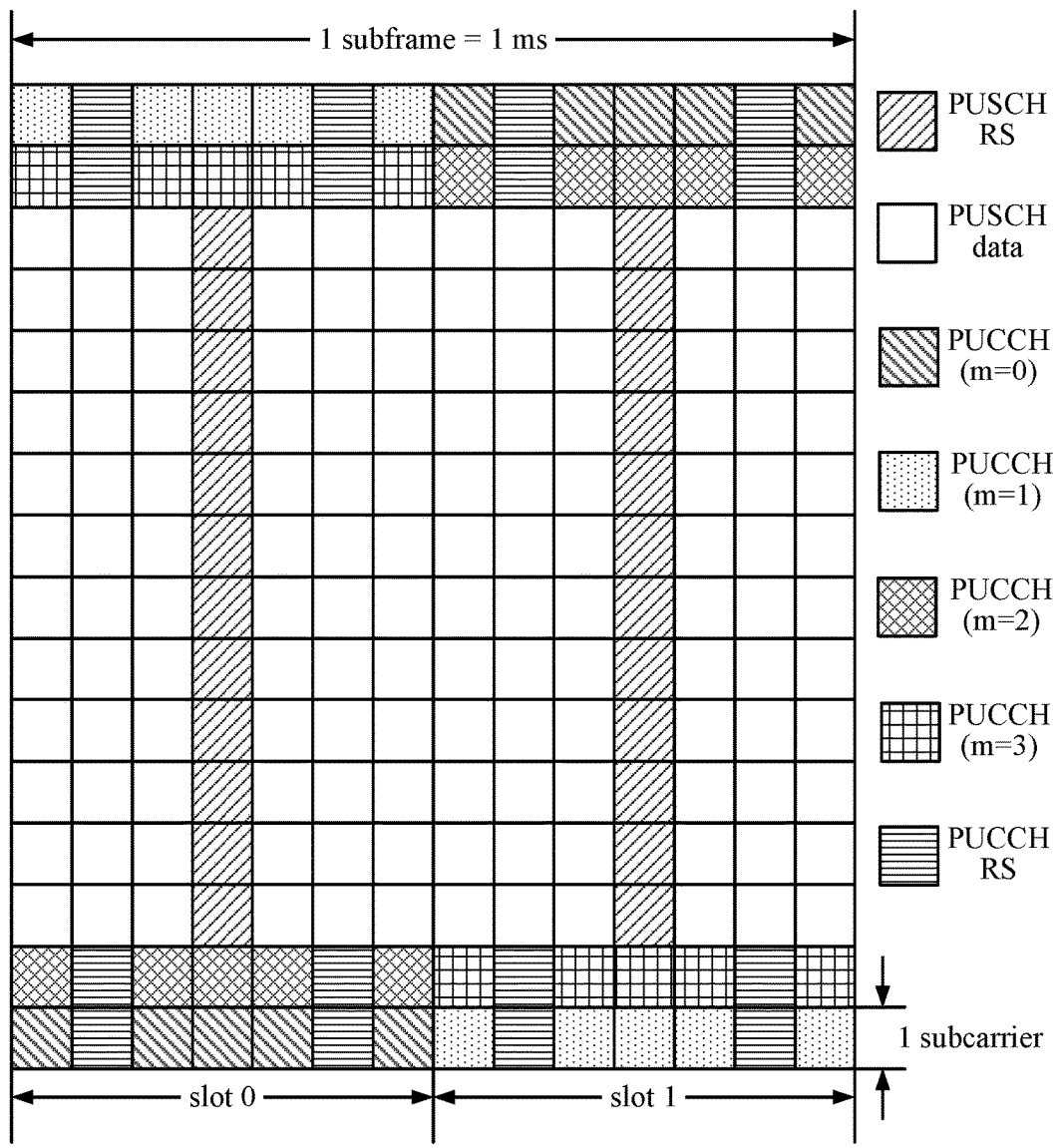

FIG. 2 illustrates particular content being transmitted in an uplink signal of an FDD wireless communication link according to an embodiment. Here, transmission of a signal is temporally partitioned into "slots" during which a series of discrete symbols may be transmitted. In the fourth symbol period of slots 0 and 1, a demodulation reference symbol (DMRS) pilot symbol is transmitted and physical uplink shared channel (PUSCH) symbols are transmitted in the first through third, and fifth through seventh symbols of slots 0 and 1. FIG. 3 illustrates particular content being transmitted in another scenario in which a DMRS pilot symbol is similarly transmitted in a fourth symbol period of slots 0 and 1 (shown as PUSCH RS). As shown, additional content may be transmitted in an initial two and last two subcarrier bands. As pointed out above according to an embodiment, a DMRS symbol transmitted by a transmitter in slots 0 and 1 of an FDD uplink of FIGS. 2 and 3 may impart a multi-tone jammer signal at a SPS receiver co-located with the transmitter (e.g., in a mobile phone). In one example scenario, a multi-tone jammer may comprise a single tone at a particular frequency that is repeated at spacings of an integer multiple of a particular harmonic frequency such as 1.0 kHz, for example. It should be understood, however that 1.0 kHz is merely an example of a particular harmonic spacing of tones in a multi-tone jammer signal, and claimed subject matter is not limited in this respect. As discussed above, the SPS receiver may be blanked during transmission of the DMRS symbol to reduce or eliminate spectral interference of a jamming signal leading to false detections at the SPS receiver.

Figure 4:
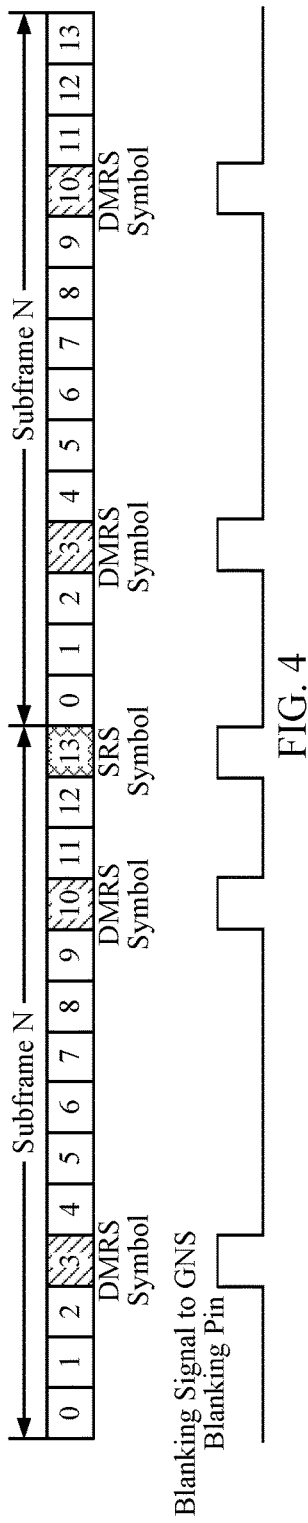
FIG. 4 is timing diagram for a blanking signal according to an embodiment.

In a particular implementation, a mobile device transmitting an FDD uplink signal may have a transceiver device and/or modem device to transmit on the uplink signal and to process downlink signals. According to an embodiment, the transceiver device and/or modem device may generate a blanking signal to be applied to a terminal of a co-located SPS receiver to control blanking the SPS receiver during portions of transmission of an FDD up link. For example, the blanking signal may be synchronized with transmission of particular content on the FDD uplink that may introduce the aforementioned multi-tone jamming effect. As shown in FIG. 4 in a particular implementation, a transceiver device and/or modem device may generate a blanking signal synchronized with transmission of particular content in an FDD uplink such as a DMRS symbol and/or an SRS symbol. The blanking signal may be applied to a terminal of a SPS receiver device to blank reception of signals during transmission of content that introduces multi-tone jamming.

According to an embodiment, band-dependent blanking of a GNSS receiver (e.g., as illustrated in FIG. 4) may be configured to be enabled/disabled for individual FDD-LTE band for non-ULCA and ULCA cases separately. For example, for an LTE B2 non-ULCA case, LTE B2 may be configured to be non-blanking since a B2 LTE band, by itself, may not interfere with or jam a GNSS receiver. In a B2/B4 ULCA case, LTE B2 can be configured to be blanking since a B4 LTE band may interfere with or jam a GNSS receiver. And in B2/B13 ULCA case, LTE B2 can be configured to be non-blanking since a B13 bad may not interfere with or jam a GNSS receiver. It should be understood, however, that these are merely examples of how bands in an FDD uplink may be separately blanked, and claimed subject matter is not limited in this respect. Blanking in individual bands in both non-ULCA and ULCA cases may be controlled independently according to a look-up table (e.g., for B2, different look-up table items for non-ULCA (single Tx), B2/B4 ULCA, B2/B13 ULCA, etc.).

According to an embodiment, blanking may be configured to be enabled in a particular FDD-LTE band of multiple bands in an uplink signal. In one implementation, modem software or firmware may control assertion of a signal to a blanking terminal of a GNSS receiver with a particular lead time (e.g., 2.0 μsec) before transmission of a DMRS or SRS symbol from an LTE transmit antenna is to begin. In another implementation, modem software or hardware may assert a blanking terminal to indicate non-blanking 2.0 μsec after transmission of a DMRS or SRS symbol. It should be understood, however, that these are merely examples of how a receiver may be controlled be blanked in response to particular content symbols, and claimed subject matter is not limited in this respect.

Figure 5:
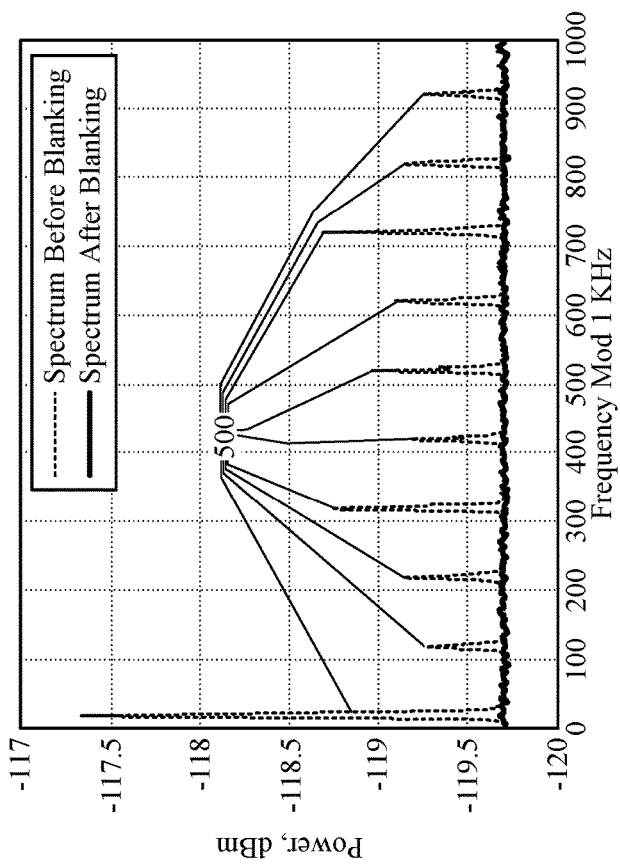
FIG. 5 illustrates change in spectrum of a signal received at a GNSS receiver using blanking according to particular embodiments.

FIG. 5 illustrates the spectrum of a multi-tone jammer signal at a GNSS receiver arising from transmission of an uplink portion of an FDD wireless communication link without blanking certain content (e.g., an SRS or DMRS symbol). Without blanking, energy peaks 500 extending above 119.5 dB may introduce false detections at the SPS receiver. Selectively blanking of the SPS receiver synchronous with particular content transmitted in the FDD uplink may substantially remove energy peaks 500.

Figure 6:
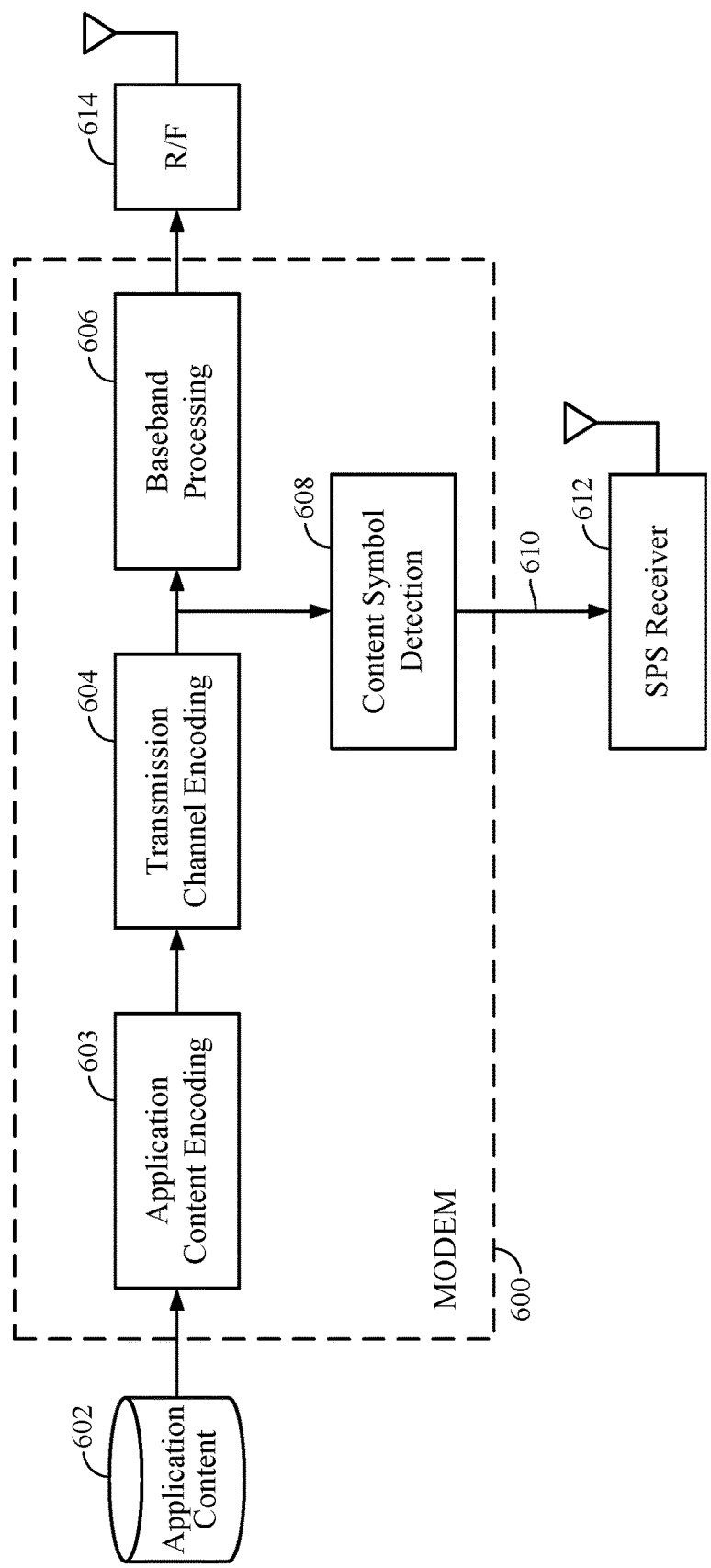
FIG. 6 is a schematic block diagram illustrating an exemplary device, in accordance with an implementation.

FIG. 6 is a schematic block diagram of a system to transmit symbols in a wireless transmission medium through radio frequency (R/F) circuitry 614 and process signals at a SPS receiver 612 in close proximity to R/F circuitry 614 (e.g., on the same handset) according to an embodiment. In a particular implementation, modem 600 may process application content 602 for transmission in an uplink signal at radio frequency (R/F) circuitry 614. Modem 600 may also provide a control signal 610 to SPS receiver 612 to selectively blank reception of signals received at GNSS receiver 612 to ameliorate jamming from transmission of content at R/F circuitry 614. Modem 600 may comprise a combination of hardware circuitry and firmware (e.g., for execution on a microprocessor or digital signal processor) to perform actions or functions to process application content 602 for transmission by R/F circuitry 614 and generation of control signal 610.

According to an embodiment, application content 602 may comprise digital content such as, for example, text for text messages, sampled audio/voice signals, digital images (e.g., video or still images), Internet Protocol packets, just to provide a few examples. Application content 602 may be stored in a memory or buffer in a digital form (e.g., as bits representing ones and zeros). While application content 603 may further exist in a particular encoded format (e.g., ASCII encoded text, vocoder or other audio encoded symbols, MPEG or JPEG encoded symbols), block 603 in modem 600 may provide some application content encoding to process application content 60 for transmission in a wireless transmission medium. In other embodiments, one or more actions described as being performed at block 603 may be performed in an application processor without deviating from claimed subject matter.

Block 604 may further prepare encoded application content for transmission in a wireless transmission medium such as an LTE FDD uplink channel. For example, as illustrated in FIGS. 2 and 3, block 604 may allocate transmission of encoded symbols containing application content to discrete transmission slots (e.g., as PUSCH symbols) and interleave additional channel specific symbols including, for example, DMRS and SRS symbols. It should be understood, however, that this is merely an example, of how application content may be further processed for transmission in a wireless communication channel, and claimed subject matter is not limited in this respect.

Encoded content generated by block 604 may be further baseband processed at block 606 by, for example, further encoding symbol content for upconversion at R/F circuitry 614. For example, block 606 may further encoded symbol content for QPSK, CDMA or QAM processing to generate a baseband signal. R/F circuitry 614 may then upconvert a baseband signal to an R/F signal for transmission in a wireless communication medium (e.g., a signal in an LTE FDD uplink) using circuitry to, for example, perform digital to analog conversion, modulation, RF upconversion and power amplification.

According to an embodiment, block 604 may generate a signal comprising a sequence of symbols in a digital form (e.g., expressed as a sequence of ones and zeros). In the particular example of channel encoded content shown in FIGS. 2 and 3, such a sequence of symbols may comprise encoded content symbols interleaved with channel specific symbols such as DMRS or SRS symbols. According to an embodiment, block 608 may analyze channel encoded content generated at block 604 to generate control signal 610 to determine instances and/or durations that SPS receiver 612 is to be blanked. For example, block 604 may analyze particular symbol patterns such as analyzing particular symbol or bit sequences allocated to particular slots for transmission in an uplink channel. In an implementation, block 604 may insert/interleave DMRS and/or SRS symbols. Block 608 may detect timing of DMRS and/or SRS symbols and predict/determine timing of transmission of the DMRS and/or SRS symbols through an antenna connected to R/F circuitry 614. Control signal 610 may effectuate a blanking signal as shown in FIG. 4 to blank SPS receiver 612 during transmission of SRS and/or DMRS symbols R/F circuitry 614. In a particular implementation, control signal 610 may comprise a voltage applied to a device pin as shown in FIG. 4. In alternative implementation, control signal may be asserted as a toggle for signaling the start of a blanked period followed by the start of an unblanked period. In another implementation, control signal 610 may provide a digital signal on a high speed bus. It should be understood, however, that these are merely examples of how control signal 610 may be implemented to effectuate blanking SPS receiver 612, and claimed subject matter is not limited in this respect.

Figure 7A:
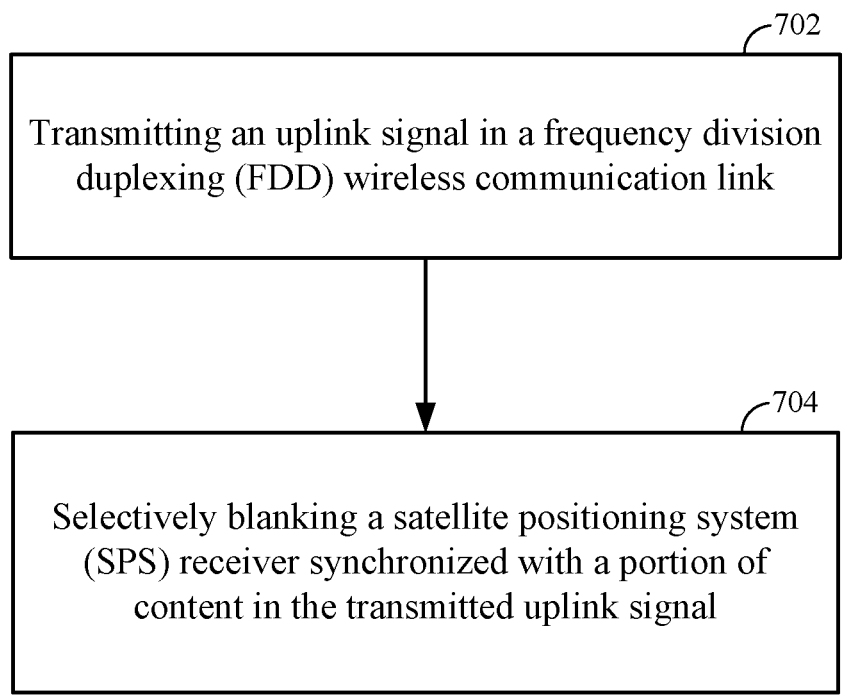
FIGS. 7A and 7B are flow diagrams of processes according to an embodiment.
Figure 7B:
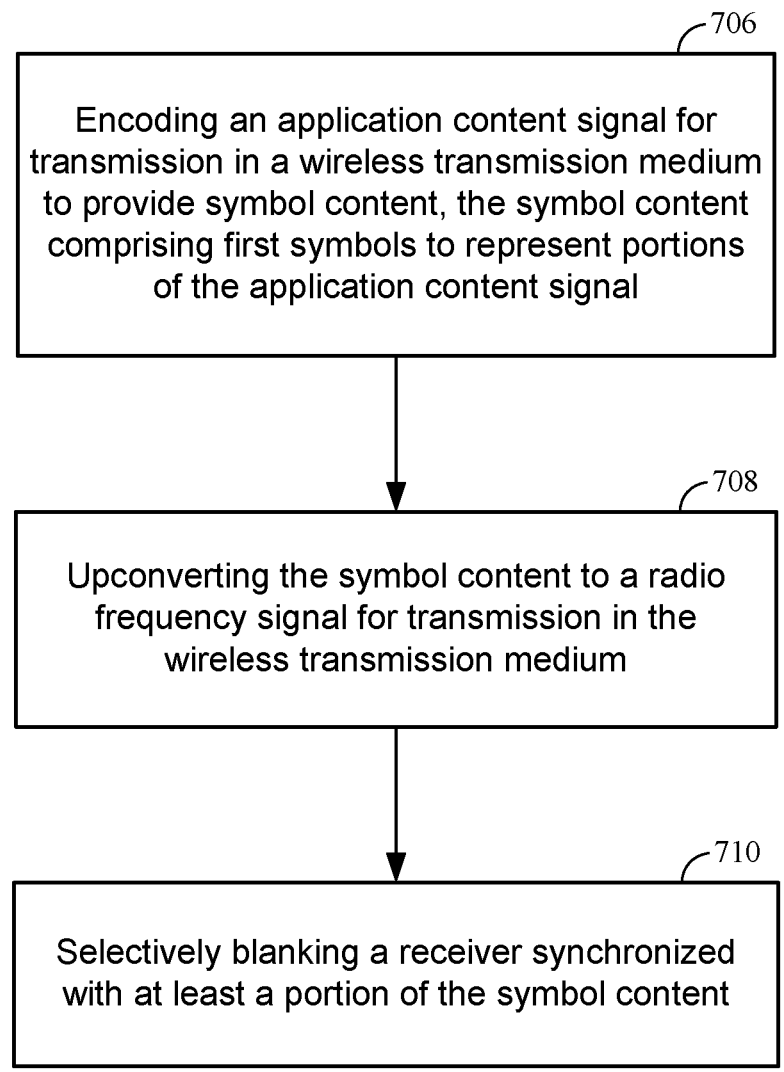

FIGS. 7A and 7B are flow diagrams of processes for blanking a receiver in a manner that is synchronized with content of a signal that is being transmitted. Actions performed at FIGS. 7A and 7B may be performed, for example, by a mobile device such as mobile device 1100 shown in FIG. 8 or an access point such as access point 1804 shown in FIG. 9. It should be understood, however, that these are merely examples of structures that may be configured to perform the actions shown in FIGS. 7A and 7B, and claimed subject matter is not limited in this respect. At block 702, an uplink signal may be transmitted in a wireless communication link. In one particular implementation, block 702 may transmit the uplink signal in an FDD wireless communication link (e.g., LTE FDD uplink). In another particular implementation, block 702 may transmit the uplink signal in a wireless local area network (WLAN) communication link or wireless personal area network (WPAN) communication link, or a combination thereof. In this context, an "uplink signal" as referred to herein means a signal that is transmitted in a wireless communication medium to a device that enables access to a wireless communication service. For example, a mobile subscriber device may transmit messages in an uplink signal to a base station in an LTE network. It should be understood, however, that this is merely an example of an uplink signal, and that claimed subject matter is not limited in this respect. In this context, "FDD wireless communication link" as referred to herein means a wireless communication link in an established format that permits transmission of messages between first and second devices such that messages transmitted from the first device to the second device are transmitted in an first portion of wireless spectrum, and messages transmitted from the second device to the first device are transmitted in a second portion of wireless spectrum that does not overlap in frequency with the first portion of wireless spectrum. In one example implementation, an uplink signal in an FDD wireless communication link transmit message from a mobile subscriber device to a base station in a frequency spectrum that does not overlap a frequency spectrum that is used for transmitting messages from the base station to the mobile subscriber device in a downlink signal. It should be understood, however, that this is merely an example of an FDD wireless communication link, and claimed subject matter is not limited in this respect.

Block 704 comprises selectively blanking a SPS receiver that is time synchronized with a portion of content transmitted in an uplink at block 702. In this context, a "SPS receiver" as referred to herein, means a receiving device that is capable of processing at least a portion of a received signal transmitted by an SPS transmitter (e.g., an SPS signal 159 transmitted by an SPS satellite 160) to obtain information (e.g., code phase detection, carrier phase detection, system time, etc.). Further in this context, "content" as referred to herein means a representation of a signal that is to be stored or transmitted independently of any specific format for transmission at a particular frequency or in particular physical transmission medium or storage medium. It should be understood that content is not necessarily limited to application content. For example, content may comprise encoded application content in combination with channel specific symbols including, for example, DMRS and SRS symbols that are interleaved with application content symbols (e.g., expressed as a series of ones and zeros for transmission in slots). In this context, as referred to herein "blanking" of a receiver means a suspension of reception of one or more signals at a receiver device for a duration of time. In one example, blanking of a receiver may comprise suspending an electrical connection to a receiver device for a duration that reception of one or more signals is to be suspended over a blanking period. In a particular implementation, an SPS receiver may be blanked for 72.0 μsec covering a period over which a DMRS symbol is transmitted, and then be unblanked over a subsequent 428.0 μsec for normal operation of the SPS receiver. Further in this context, "selectively blanking" as referred to herein means a process of controlling a receiving device in such a manner so as to suspend processing of a received signal. For example, a receiving device may be selectively blanked by, for example, disconnecting receiving circuitry from the received signal, removing power from at least a portion the receiving device, attenuating/grounding the received signal, just to provide a few examples. In an implementation, a receiver device may be blanked in response to application of a voltage signal (e.g., control signal 610) of an input terminal of a switch to electrically disconnect the receiver device during a blanking period. In another implementation, blacking a receiver may comprise forcing digital processing circuitry in a receiver (e.g., analog to digital conversion circuit) to provide 0.0 V as an output signal over a blanking period. It should be understood, however, that this is merely an example of how a receiver device may be blanked, and that claimed subject matter is not limited in this respect.

Further in this context, blanking of a receiver "synchronized with a portion of content," as referred to herein, means that the receiving is being blanked during instances and/or periods that are synchronized with features of content being transmitted. In a particular example implementation as illustrated in FIG. 6, SPS receiver 612 may be selectively blanked based, at least in part, on the timing of DMRS or SRS symbols detected in symbol content generated at block 604. For example, SPS receiver 612 may be selectively blanked during intervals at which DMRS or SRS signals are to be transmitted through an antenna connected to R/F circuitry 614. In one example, as pointed out above, control signal 610 may comprise a blanking signal may be provided to SPS receiver 612 with a lead time (e.g., 2.0 μsec) prior to transmission of particular content (e.g., DMRS or SRS symbols or other content imparting a jamming effect) through R/F circuitry 614. It should be understood, however that this is merely an example of how blanking of a receiver may be synchronized with content that is transmitted in an uplink signal, and claimed subject matter is not limited in this respect.

In a particular implementation, block 704 may comprise selectively blanking based, at least in part, on a particular channel or frequency band of the uplink signal. For example, block 704 may blank an SPS receiver for uplink transmission for ULCA LTE B2/B4, but not for an LTE B2 non-ULCA case. Also, block 704 may comprise selectively blanking based on a transmission power of applied by a transmitter to transmit the uplink signal at block 702. Furthermore, for a multi-band SPS receiver (e.g., capable of processing any combination of GPS, GLONASS, Beidou or Galileo signals), block 704 may selectively blank some SPS bands but not others.

FIG. 7B is a flow diagram of a process according to an alternative embodiment. Block 706 comprises encoding an application content signal for transmission in a wireless communication medium to provide symbol content. In this context, "application content signal" as referred to herein means an expression or representation of content in support of an application (e.g., text, audio signal, image signal, etc.) in a particular format. "Symbol content" as referred to herein comprises discrete encoded expressions in a particular format that, if combined properly according to a format, represent all or a portion of content to be transmitted in a wireless transmission medium. In the example of FIG. 6 discussed above, symbol content may comprise a sequence of symbols as generated by block 604 which may include encoded symbols representing application content interleaved with channel control symbols. Accordingly, it should be recognized that in this particular context, symbol content is not necessarily limited to encoded symbols representing application content, but may also include channel control symbols such as a DMRS or SRS symbol. It should be understood, however, that this is merely an example of symbol content, and that claimed subject matter is not limited in this respect.

Block 708 may comprise upconverting symbol content generated at block 706 to an R/F frequency for transmission in the wireless transmission medium. In this context, "upconverting" as referred to herein means converting a signal to a particular format suitable for transmission at a particular carrier frequency in a transmission medium. For example, R/F circuitry 614 may modulate signal at a particular carrier frequency according to a baseband signal from block 606 (wherein the baseband signal is based, at least in part, on symbol content generated by block 604). Block 710 then selectively blanks a receiver synchronized with a portion of symbol content as discussed above.

Figure 8:
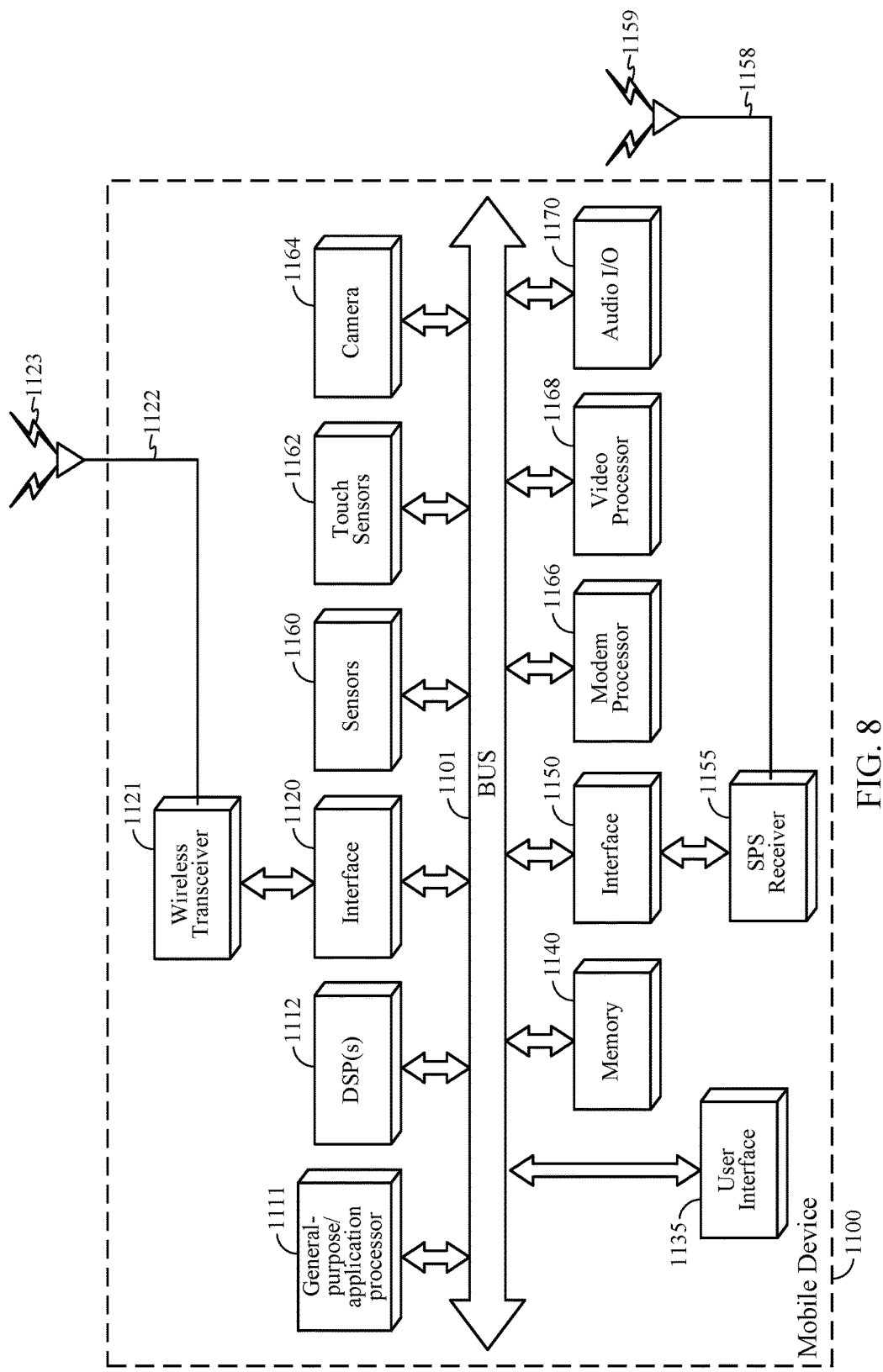
FIG. 8 is a schematic block diagram of an example computing system in accordance with an implementation.

Subject matter shown in FIG. 8 may comprise features, for example, of a computing device, in an embodiment. It is further noted that the term computing device, in general, refers at least to one or more processors and a memory connected by a communication bus. Likewise, in the context of the present disclosure at least, this is understood to refer to sufficient structure within the meaning of 35 USC § 112(f) so that it is specifically intended that 35 USC § 112(f) not be implicated by use of the term "computing device," "wireless station," "wireless transceiver device" and/or similar terms; however, if it is determined, for some reason not immediately apparent, that the foregoing understanding cannot stand and that 35 USC § 112(f) therefore, necessarily is implicated by the use of the term "computing device,"

"wireless station," "wireless transceiver device" and/or similar terms, then, it is intended, pursuant to that statutory section, that corresponding structure, material and/or acts for performing one or more functions be understood and be interpreted to be described at least in FIGS. 6, 7A and 7B, and corresponding text of the present disclosure.

FIG. 8 is a schematic diagram of a mobile device according to an embodiment. Mobile device 100 (FIG. 1) may comprise one or more features of mobile device 1100 shown in FIG. 8. In certain embodiments, mobile device 1100 may also comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth, just to name a few examples.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1000. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals for use in performing positioning operations may be performed in memory 1140 or registers (not shown).

According to an embodiment, SPS receiver 1155 may comprise a terminal or pin to receive a blanking signal. For example, the SPS receiver 1155 may blank reception from time to time responsive to the blanking signal. In a particular implementation, wireless transceiver 1121 or modem processor 1166 may be connected by a wired signal path (not shown) to the terminal or pin of SPS receiver 1155 to assert a blanking signal on the terminal or pin synchronous with content transmitted by wireless transceiver 1121 on an uplink portion of an FDD wireless communication link as discussed above. For example, wireless transceiver 1121 or modem processor 1166 may have one or more features of modem 600 to generate a control signal for blanking reception at SPS receiver 1155 as described above.

Also shown in FIG. 8, mobile device 1100 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein. In a particular implementation, wireless transceiver 1121 may communicate with general-purpose processor(s) 1111 and/or DSP(s) 1112 through bus 1101 to enable mobile device 1100 to be configured as a wireless STA as discussed above. General-purpose processor(s) 1111 and/or DSP(s) 1112 may execute instructions to execute one or more aspects of processes discussed above in connection with FIGS. 6, 7A and 7B.

Also shown in FIG. 8, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose/application processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Dedicated camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, dedicated video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose/application processor 1111 in support of one or more applications such as, for example, applications directed to positioning or navigation operations.

In a particular implementation, mobile device 1100 may comprise a dedicated modem processor 1166 capable of performing baseband processing of signals received and downconverted at wireless transceiver 1121. Similarly, dedicated modem processor 1166 may perform baseband processing of signals to be upconverted for transmission by wireless transceiver 1121. In an example implementation, modem processor 1166 may have one or more features of modem 600 discussed above. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

In one embodiment, as described above, a method, at a communication device, comprises: encoding an application content signal for transmission in a wireless transmission medium to provide symbol content, the symbol content comprising first symbols to represent portions of the application content signal; upconverting the symbol content to a radio frequency signal for transmission in the wireless transmission medium; and selectively blanking a receiver synchronized with at least a portion of the symbol content. In a particular implementation, the symbol content further comprises second symbols interleaved with the first symbols to control a communication channel in the wireless transmission medium. In another particular implementation, selectively blanking the receiver further comprises generating a blanking signal synchronized with at least a portion of the second symbols. In another particular implementation, the second symbols comprise DMRS or SRS symbols. In another particular implementation, the symbol content is upconverted for transmission in an FDD wireless communication link. In another particular implementation, the symbol content is upconverted for transmission in a WLAN communication link or a WPAN communication link, or a combination thereof.

In another embodiment, as described above a communication device comprises: a receiver to receive radio frequency signals; a modem device to: encode an application content signal for transmission in a wireless transmission medium to provide symbol content, the symbol content comprising first symbols to represent portions of the application content signal; and generate a signal to selectively blank the receiver synchronized with at least a portion of the symbol content. In one particular implementation, the communication device further comprises radio frequency circuitry to upconvert the symbol content for transmission in the wireless transmission medium. In another particular implementation, the symbol content further comprises second symbols interleaved with the first symbols to control a communication channel in the wireless transmission medium. In another particular implementation, selectively blanking the receiver further comprises generating a blanking signal synchronized with at least a portion of the second symbols. In another particular implementation, the second symbols comprise DMRS or SRS symbols. In another particular implementation, the symbol content is upconverted for transmission in an FDD wireless communication link. In another particular implementation, the symbol content is upconverted for transmission in a WLAN communication link or a WPAN communication link, or a combination thereof.

In another embodiment, as described above a storage medium comprises computer-readable instructions stored thereon which are executable by a processor of a communication device to: encode an application content signal for transmission in a wireless transmission medium to provide symbol content, the symbol content comprising first symbols to represent portions of the application content signal; and generate a signal to selectively blank the receiver synchronized with at least a portion of the symbol content. In one particular implementation, the symbol content further comprises second symbols interleaved with the first symbols to control a communication channel in the wireless transmission medium. In another particular implementation, selectively blanking the receiver further comprises generating a blanking signal synchronized with at least a portion of the second symbols. In another particular implementation, the second symbols comprise DMRS or SRS symbols. In another particular implementation, the symbol content is upconverted for transmission in an FDD wireless communication link. In another particular implementation, the symbol content is upconverted for transmission in a WLAN communication link or a WPAN communication link, or a combination thereof.

In another embodiment, as described above a communication device comprises: means for encoding an application content signal for transmission in a wireless transmission medium to provide symbol content, the symbol content comprising first symbols to represent portions of the application content signal; means for upconverting the symbol content to a radio frequency signal for transmission in the wireless transmission medium; and means for selectively blanking a receiver synchronized with at least a portion of the symbol content. In one particular implementation, the symbol content further comprises second symbols interleaved with the first symbols to control a communication channel in the wireless transmission medium. In another particular implementation, selectively blanking the receiver further comprises generating a blanking signal synchronized with at least a portion of the second symbols. In another particular implementation, the second symbols comprise DMRS or SRS symbols. In another particular implementation, the symbol content is upconverted for transmission in an FDD wireless communication link. In another particular implementation, the symbol content is upconverted for transmission in a WLAN communication link or a WPAN communication link, or a combination thereof.

As used herein, the term "mobile device" refers to a device that may from time to time have a position location that changes. The changes in position location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, bytes, values, elements, symbols, characters, terms, numbers, numerals, expressions, messages, fields, identifiers frames, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. In this context, a "wireless communication network" comprises multiple devices or nodes capable of communicating with one another through one or more wireless communication links. As shown in FIG. 1, for example, a wireless communication network may comprise two or more devices from mobile devices 100a, 100b, 115a and 115b. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("WCDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples. References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn. While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method, at a mobile device, comprising:
   transmitting an uplink signal in a wireless communication link; and
   selectively blanking a satellite positioning system (SPS) receiver synchronized with a portion of content in the transmitted uplink signal, wherein the portion of content in the transmitted uplink signal comprises a demodulation reference signal (DMRS) symbol or a sounding reference signal (SRS) symbol.

2. The method of claim 1, wherein selectively blanking the SPS receiver further comprises applying a blanking signal to a terminal of the SPS receiver.

3. The method of claim 1, wherein the content in the transmitted uplink signal comprises application content and channel specific symbols.

4. The method of claim 1, wherein selectively blanking the SPS receiver synchronized with the portion of content in the transmitted uplink signal comprises applying a voltage to a terminal of the SPS receiver.

5. The method of claim 4, wherein the voltage is applied at a lead time before transmission of the portion of content by radio frequency circuitry.

6. The method of claim 1, wherein the uplink signal is transmitted in a frequency division duplexing (FDD) wireless communication link.

7. The method of claim 1, wherein the uplink signal is transmitted in a wireless local area network or wireless personal area communication link, or a combination thereof.

8. The method of claim 1, wherein selectively blanking comprises selectively blanking based, at least in part, on a particular channel or frequency band of the uplink signal.

9. The method of claim 1, wherein the SPS receiver is capable of processing SPS signals transmitted from a plurality of different GNSS bands, and wherein selectively blanking comprises selectively blanking at least one of the GNSS bands while not blanking at least one other one of the GNSS bands.

10. A mobile device comprising:
a satellite positioning system (SPS) receiver to acquire SPS signals; and
a modem device configured to:
encode content for transmission in an uplink signal in a wireless communication link; and
generate a signal to blank the SPS receiver synchronized with a portion of the content wherein the portion of content in the transmitted uplink signal comprises a demodulation reference signal (DMRS) symbol or a sounding reference signal (SRS) symbol.

11. The mobile device of claim 10, wherein the modem device is further configured to selectively blank the SPS receiver by applying a blanking signal to a terminal of the SPS receiver.

12. The mobile device of claim 10, wherein the content in the transmitted uplink signal comprises application content and channel specific symbols.

13. The mobile device of claim 10, wherein selectively blanking the SPS receiver synchronized with the portion of content in the transmitted uplink signal comprises applying a voltage to a terminal of the SPS receiver.

14. The mobile device of claim 13, wherein the voltage is applied at a lead time before transmission of the portion of content by radio frequency circuitry.

15. The mobile device of claim 10, wherein the uplink signal is transmitted in a frequency division duplexing (FDD) wireless communication link.

16. The mobile device of claim 10, wherein the uplink signal is transmitted in a wireless local area network or wireless personal area communication link, or a combination thereof.

17. The mobile device of claim 10, wherein the modem device is configured to selectively blank based, at least in part, on a particular channel or frequency band of the uplink signal.

18. The mobile device of claim 10, wherein the SPS receiver is capable of processing SPS signals transmitted from a plurality of different global navigation satellite system (GNSS) bands, and wherein the modem device is further configured to selectively blank at least one of the GNSS bands while not blanking at least one other one of the GNSS bands.

19. A mobile device, comprising:
means for transmitting an uplink signal in a wireless communication link; and
means for selectively blanking a satellite positioning system (SPS) receiver synchronized with a portion of content in the transmitted uplink signal, wherein the portion of content in the transmitted uplink signal comprises a demodulation reference signal (DMRS) symbol or a sounding reference signal (SRS) symbol.

20. The mobile device of claim 19, wherein the means for selectively blanking the SPS receiver further comprises means for applying a blanking signal to a terminal of the SPS receiver.

21. The mobile device of claim 19, wherein the means for selectively blanking the SPS receiver synchronized with the portion of content in the transmitted uplink signal comprises means for applying a voltage to a terminal of the SPS receiver.

22. The mobile device of claim 19, wherein the means for selectively blanking comprises means for selectively blanking based, at least in part, on a particular channel or frequency band of the uplink signal.

23. A non-transitory storage medium comprising computer-readable instructions stored thereon which are executable by one or more processors of a mobile device to:
encode content for transmission in an uplink signal in a wireless communication link; and
generate a signal to blank an SPS receiver synchronized with a portion of the content wherein the portion of content in the transmitted uplink signal comprises a demodulation reference signal (DMRS) symbol or a sounding reference signal (SRS) symbol.

24. The non-transitory storage medium of claim 23, wherein the content in the transmitted uplink signal comprises application content and channel specific symbols.

25. The non-transitory storage medium of claim 23, wherein the uplink signal is transmitted in a frequency division duplexing (FDD) wireless communication link.

* * * * *